June 13, 1961 L. D. SANDERS 2,988,329
MATERIAL HANDLING APPARATUS
Filed Oct. 20, 1958 3 Sheets-Sheet 1
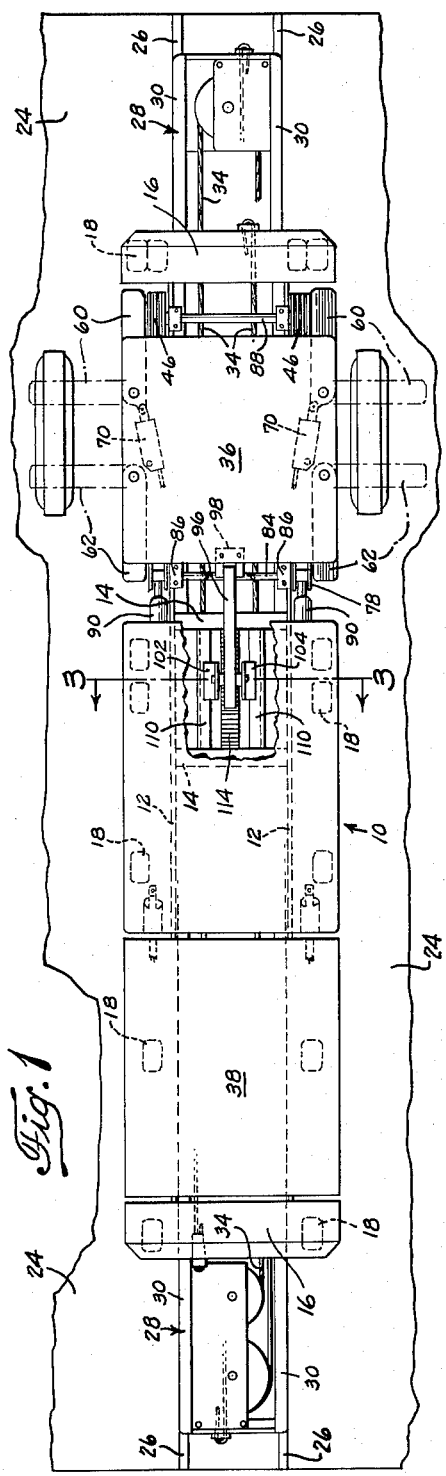
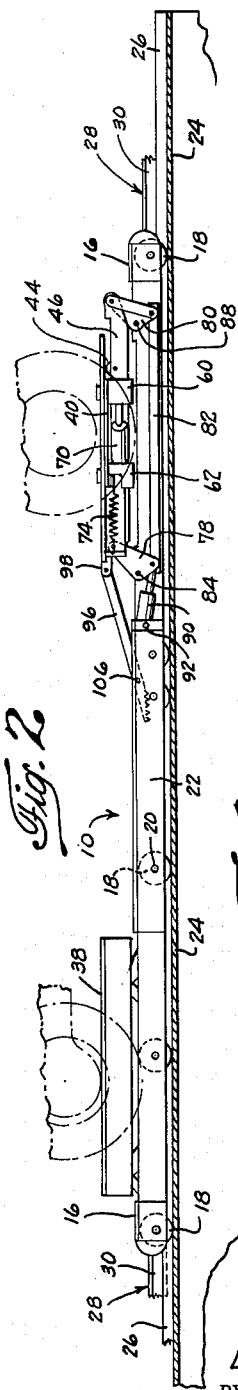
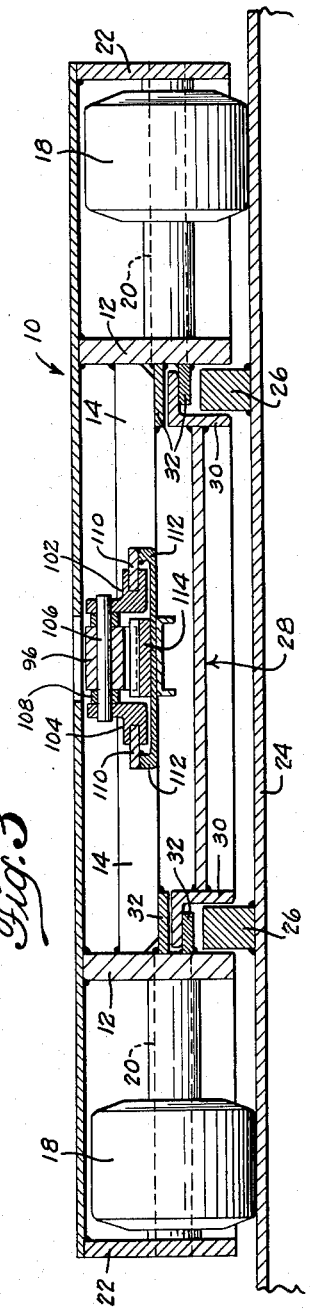
INVENTOR.
LEON DONALD SANDERS
BY
Morgan, Finnegan, Durham & Pine
ATTORNEYS.

June 13, 1961

L. D. SANDERS 2,988,329

MATERIAL HANDLING APPARATUS

Filed Oct. 20, 1958

INVENTOR.
LEON DONALD SANDERS
BY
Morgan, Finnegan, Durham & Pine
ATTORNEYS.

June 13, 1961 L. D. SANDERS 2,988,329
MATERIAL HANDLING APPARATUS
Filed Oct. 20, 1958 3 Sheets-Sheet 3
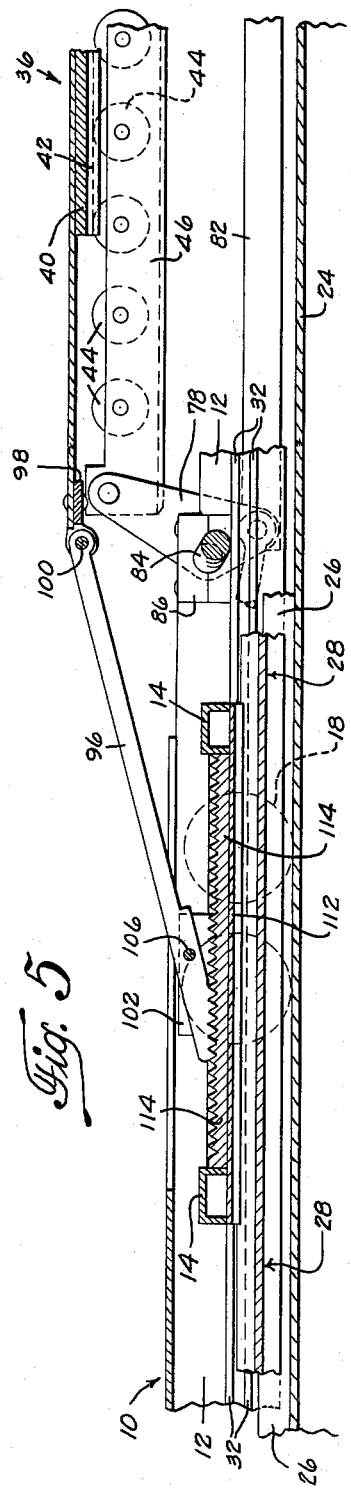
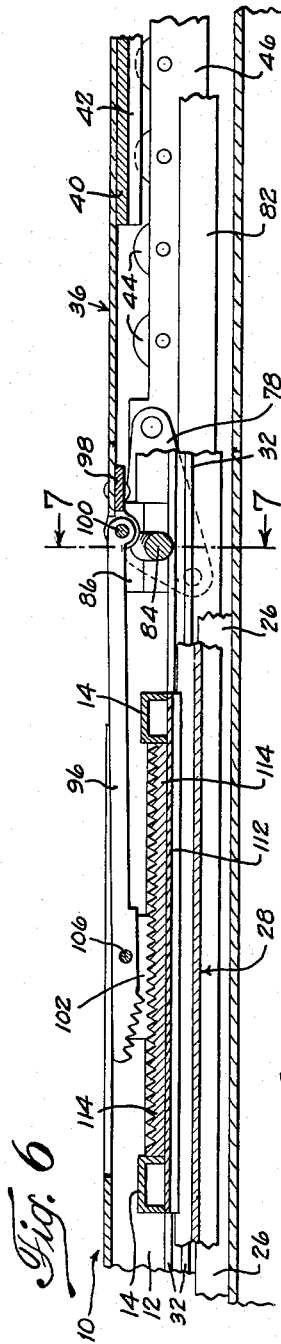
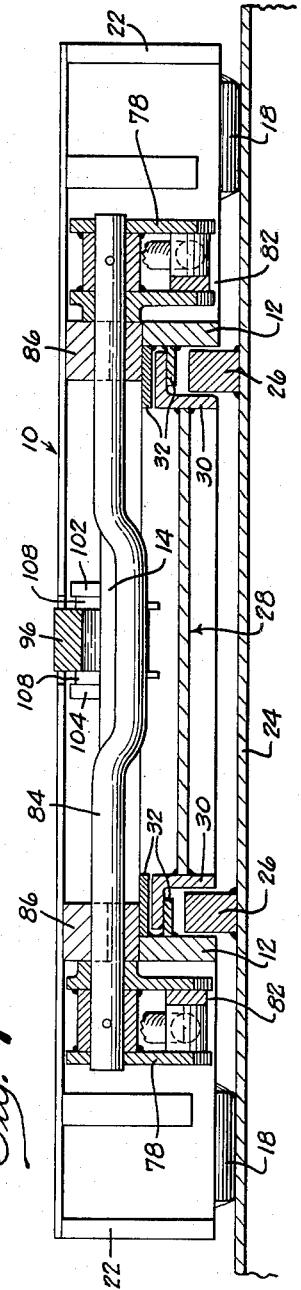
INVENTOR.
LEON DONALD SANDERS
BY
Morgan, Finnegan, Durham & Pine
ATTORNEYS.

United States Patent Office 2,988,329
Patented June 13, 1961

2,988,329
MATERIAL HANDLING APPARATUS
Leon Donald Sanders, York, Pa., assignor to Systematic Parking Company, Spokane, Wash., a corporation of Washington
Filed Oct. 20, 1958, Ser. No. 768,463
8 Claims. (Cl. 254—2)

This invention relates generally to material handling apparatus and has specific relation to apparatus for mechanically transferring vehicles from one place to another as for example from an elevator of a parking facility to and from the parking stalls of this facility.

Objects and advantages of the invention will be obvious herefrom, or may be learned by practice with the invention, the same being realized and attained by means of the instrumentalities and combinations pointed out in the appended claims.

It is the object of this invention to provide an improved apparatus for mechanically transferring vehicles from one location to another. Another object is to provide a vehicle transfer apparatus which includes jacking mechanism for raising a vehicle and supporting it from the apparatus with the mechanism being adjustable for vehicles of varying length and being extremely simple but safe in its operation with the vehicle bearing portions of the jacking mechanism being positively secured to the transfer apparatus when the jacking mechanism is in its raised position. Still another object is to provide such a transfer apparatus wherein a portion of the jacking mechanism is movable longitudinally of the dolly for adjusting to vehicles of different length with this portion being locked in its particular adjusted longitudinal position when moved to its elevated vehicle raising position and with this locking being accomplished automatically in response to movement of this portion to its raised position. A still further object is to provide such a transfer apparatus that includes a motor driven dolly that is receivable beneath a vehicle and that carries the adjustable jacking mechanism with the construction being such that the dolly will not tend to accelerate from beneath the vehicle during operation and with the construction at the same time being simple and reliable in operation.

In genral, the invention comprises a vehicle transfer device which is of a height and width that permits it to be rolled longitudinally beneath an automobile and then raise the automobile so that it can be supported thereon. This transfer device is in the form of a dolly which may be motor operated, as for example motor driven to and from an elevator from and to parking stalls on each side of the elevator. The dolly carries motor operated jacking mechanism for engaging and raising a vehicle after the dolly has been placed beneath it and so the vehicle will be supported by and moved with the dolly. This jacking mechanism includes jacking platforms generally at each end of the dolly with one of these platforms being adjustable longitudinally of the dolly when in its lower position. Because it is undesirable to have this platform move longitudinally of the dolly when in its raised position, as this would tend to accelerate the dolly from beneath the automobile during rapid starts, stops, and reverses of movement of the dolly, a locking mechanism is provided to lock this platform longitudinally of the dolly when in its raised position while permitting longitudinal movement relative to the dolly when in its lowered position. As illustratively disclosed this locking mechanism is in the form of a lever or link arm that is pivoted to the platform and pivotally secured to a block or guide slidably mounted on the dolly. The end of this link arm adjacent the dolly is provided with serrations or teeth that are complementary with the teeth of a rack that is secured to the dolly with the link arm engaging the rack when the platform is moved to its raised position but being spaced from the rack when the platform is in its lower position thereby preventing longitudinal movement of the platform relative to the dolly when in the former position but permitting such movement when in the latter position.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

In the drawings:

FIGURE 1 is a plan view of the transfer device with one pair of the wheels of a vehicle being illustrated in their operative position and with a portion of the dolly being broken away to show details of the locking mechanism;

FIGURE 2 is a side view of the transfer device of FIGURE 1 and showing in dotted lines both the rear and front wheels of a vehicle;

FIGURE 3 is a sectional view taken generally along line 3—3 of FIGURE 1 and showing in detail the slidable guide for the end of the link arm pivoted to the dolly of the transfer device;

FIGURE 5 is a sectional view taken along line 5—5 of FIGURE 4;

FIGURE 6 is a view similar to that of FIGURE 5 but showing the jacking mechanism in its lower position; and, FIGURE 7 is a sectional view taken along line 7—7 of FIGURE 6.

Figure 4:
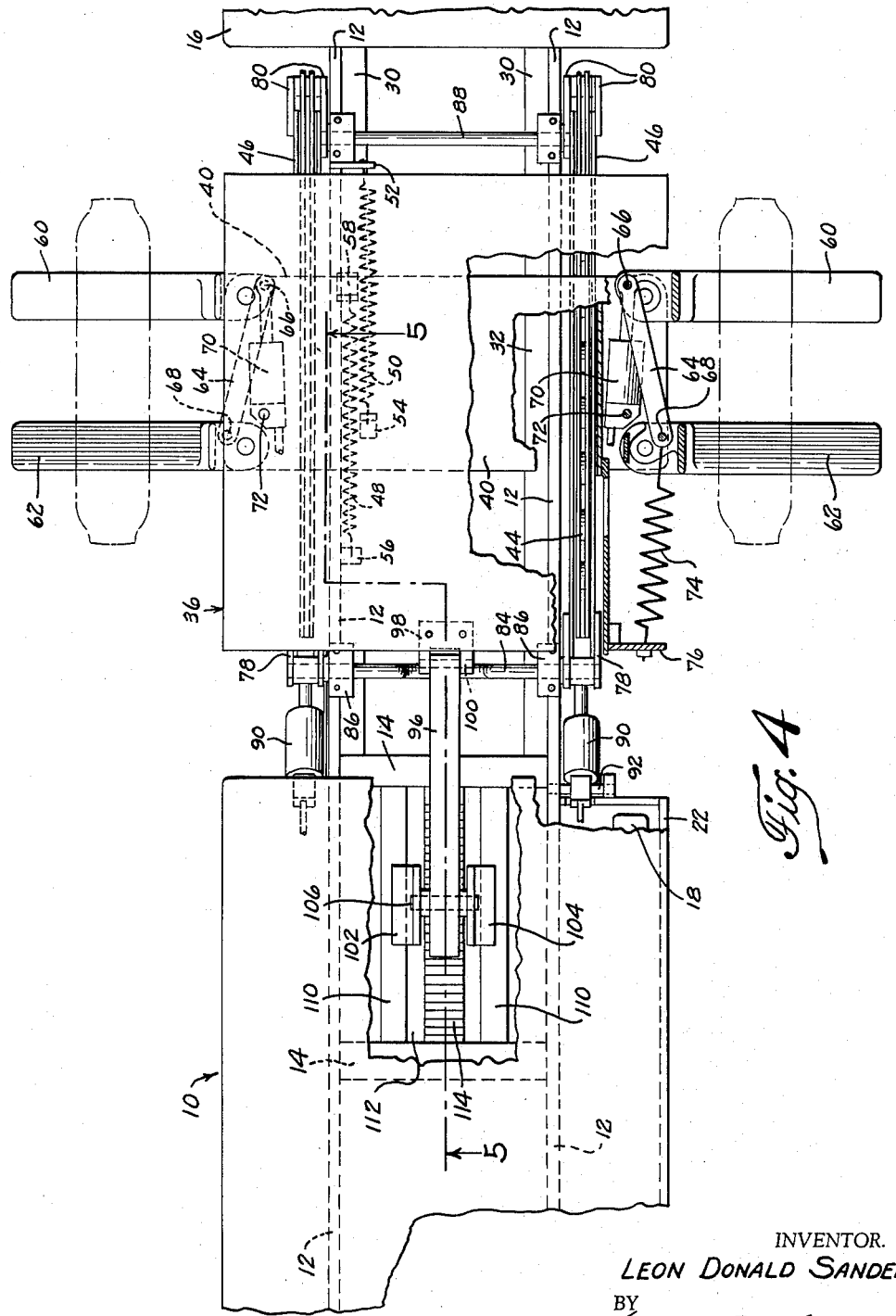
FIGURE 4 is a plan view of a portion of the transfer device with parts broken away to show details thereof, with the portion of the device being that shown at the right of FIGURE 1 and with the various parts being in the positions they occupy when a vehicle is supported thereon in a raised position.

Referring now to the drawings, wherein like reference characters are used throughout to designate like elements, the illustrative and preferred embodiment of the invention depicted therein comprises a vehicle transfer device for transferring automobiles to and from an elevator in a parking facility with this transfer device including dolly 10 which has a rigid frame made of elongated structural side members 12 (FIG. 3) extending generally along each side of the dolly and tied together in spaced parallel relation by various cross members 14 and end parts 16. Along the outer face of the side members 12 are mounted numerous rollers 18 each of which is journaled on a shaft 20 extending between side members 12 and outer side plates 22. The dolly rests upon the floor 24, which may be the floor of an elevator with rollers 18 engaging the floor and providing for easy movement of the dolly thereon. The dolly is guided in its movement by a pair of guide bars 26 welded to and forming part of the floor 24.

The dolly is adapted to be moved longitudinally and is constructed so that it may be positioned beneath a vehicle where it can raise the vehicle so it is supported from the dolly with the dolly and vehicle then moving together for transfer of the vehicle to a desired location. This longitudinal movement of the dolly is effected through suitable motor operated drive mechanism which includes extension slide 28 mounted beneath and slidably carried by the dolly. This slide 28 is provided along each side with an angle bar 30 the horizontal leg of which is slidably carried between spaced brackets 32 mounted on the inner face of the dolly side member 12. The extension slide forms part of the motor drive mechanism for the dolly with this drive being connected with the dolly through drive cables 34 that are trained over sheaves or pulleys carried by the extension slide with the cables being connected with the dolly and with motor operated drums or the like not shown. The drive mechanism is constructed in accordance with the drive shown and explained in my pending application #635,050 filed Jan. 18, 1957, now Patent No. 2,845,189, and since the details of this mechanism form no part of this invention they are not shown and described herein.

As previously mentioned the dolly carries jacking mechanism for raising and lowering a vehicle in order that the vehicle may be supported from the dolly and accordingly moved with it. This jacking mechanism includes a forward platform 36 that is motor operated to and from a raised and a lowered position and a rear platform 38 that is also raised and lowered. The forward platform comprises a main plate 40 and has adjacent each side a longitudinally extending guide channel 42 in which is received a plurality of rollers 44 on which the main plate 40 is adapted to roll longitudinally of the dolly. The rollers 44 are journaled in a jack bar 46 one of which is provided along each side of the dolly and preferably has a length considerably greater than that of plate 40. Thus from a central position on the jack bars 46 the forward platform 36 can be rolled on rollers 44 either forwardly or rearwardly of the dolly to the extent permitted by the length of jack bars 46. The platform 36 is urged to a central position on the jack bars by a pair of opposing tension springs 48 and 50 (FIG. 4) with the forward or right end of spring 50 anchored at 52 on the dolly side member 12 and its rear end anchored by bracket 54 secured to the under side of the plate 40. Spring 48 is anchored to side member 12 at 56 which is considerably to the rear of anchor point 52 of spring 50 and has its forward end anchored by bracket 58 secured to the main plate 40. Thus if platform 36 is moved forward along rollers 44, to the right in FIGURE 4, spring 48 is stretched and tends to return the platform to its central position while movement of the platform to the rear (left) stretches spring 50 which in turn tends to return the platform to the central position.

Each side of the forward platform 36 is provided with a pair of swingable arms adapted to swing horizontally outward from the platform so as to contact and cradle the front wheels of a vehicle. Each pair of arms comprises a forward arm 60 and a rear arm 62. The inner end of each arm is journaled to the platform for pivotal movement about a vertical axis and the arms 60 and 62 of each pair are connected together at their pivoted ends by a link 64 one end of which is pivoted at 66 to arm 60 and the other end at 68 to arm 62. These pivots 66 and 68 are arranged to that the arms 60 and 62 of each pair are constrained to move together in opposite directions. Movement of the arms from a retracted position where they are parallel with the dolly to the extended position where they extend laterally from the dolly as shown in FIGURE 4 is effected by the application of pressure in the hydraulic cylinder 70 associated with each pair of arms. This hydraulic cylinder is pivotally mounted on support rod 72 and has the outer end of its piston rod pivotally connected with the link pivot 65 of arm 60. While this hydraulic cylinder moves the arms from their retracted to their extended position the arms are moved in the opposite direction and are biased to the retracted position by means of tension spring 74 which has one end secured to pivot 68 and the other adjustably anchored to plate 76.

The platform 36 is raised or jacked to its upper position, shown in FIGURE 5, from its lower position, shown in FIGURE 6, by means of a motor operated jacking mechanism connected with the jack bars 46 and which includes lever 78 pivotally connected to the rear end of each jack bar and a similar pair of levers 80 pivotally connected to the forward end of each jack bar. The levers are interconnected by a pair of links 82 each having one end pivotally connected to the rear pair of levers 78 and the other end pivotally connected to one of the forward pair of levers 80. The two rear levers 78, one on each side of the dolly, are fixed upon opposite ends of shaft 84 which is transversely mounted on the dolly in bearing blocks 86. Similarly the pair of forward levers 80, one on each side of the dolly, are fixed upon opposite ends of shaft 88 which is also mounted on the dolly in suitable bearings. These shafts 84 and 88 act as pivots about which the two pairs of levers 78 and 80 oscillate and by this arrangement jack bars 46 and hence the forward platform 36 can be raised and lowered so the platform is always maintained in a horizontal position and the arms 60 and 62, being mounted on the platform, move therewith.

The required power for raising platform 36 is provided by hydraulic means which means comprises hydraulic cylinders 90 one end of which is pivotally mounted on each side of the dolly on pin 92 with the piston rod that extends from each of the cylinders being pivotally connected with the levers 78 and, through the link 82, the levers 80 to rotate them counterclockwise to raise the platform, arms 60 and 62 and the front of the vehicle whose front wheels are cradled in the arms. Release of pressure from cylinders 90 allows the platforms and arms to descend under the influence of gravity.

Since platform 36 is longitudinally movable of the dolly in order to accommodate vehicles of varying length and in order to adjust to the particular position of the vehicle, if there were no means to prevent this relative movement after the platforms 36 and 38 were raised so that the vehicle was supported from the dolly there would be a tendency to slide or accelerate the dolly from beneath the vehicle upon rapid starts, stops, and reversals of the dolly. Accordingly, in accordance with the invention a locking device is provided to prevent relative longitudinal movement of platform 36 and dolly 10 when the platform is moved to its raised position. This locking mechanism comprises link arm 96 pivoted at its forward end to the bracket 98 which is secured to the under side of platform 36 and is bifurcated with arm 96 received between the bifurcates and with pin 100 being received within aligned bores in the link arm and the bifurcates. The other end of link arm 96 is pivotally connected to the dolly by means of a slide connector which comprises angle brackets 102 and 104 with the upright leg of each of these brackets being bored to receive pin 106. The link arm is received between these brackets with pin 106 extending through a suitable bore in the arm which bore is spaced from the rear end (left as viewed in FIGS. 5 and 6) of the arm. Link arm 96 is maintained in spaced relation with the brackets 102 and 104 by means of the spacers 108 disposed on shaft 106. The horizontal leg or flange of these brackets 102 and 104 is slotted, as best shown in FIGURE 3, with plates 110 being received in the slots in a manner which permits the brackets to slide along these plates. These plates are fixed, as by welding, to the dished or channel support 112 that extends between the cross members 14 and is secured to this frame portion of the dolly. Also fixed to this dished support is the longitudinally extending rack 114 with this rack being positioned beneath and aligned with link arm 96. The end of this link arm which is pivoted to the brackets 102 and 104 is provided with teeth or serrations complementary with the rack and the pivotal connection of the link arm is such that when platform 36 is in its lower position, as shown in FIGURE 6, link arm 96 is spaced from rack 114 so that the platform is adjustable on rollers 44 longitudinally of the dolly. Upon elevating the platform to its raised position by means of the jacking mechanism this end of link arm 96 is moved into engagement with the rack with the complementary teeth of the link arm and the rack being intermeshed as shown in FIGURE 5 and with this engagement of the link arm with the rack preventing longitudinal movement of the platform 36 relative to the dolly and accordingly eliminating the possibility of the dolly being accelerated out from under the vehicle while supporting the vehicle.

In operation, the dolly is positioned beneath a vehicle and platform 36 is adjusted longitudinally of the dolly so that arms 60 and 62 may cradle one pair of the wheels of the vehicle. Then pressure is admitted to cylinders 70 to move these arms from the retracted to the extended wheel cradling position and thereafter platforms 36 and 38 are raised by suitable motors to lift the vehicle and support it from the dolly with platform 36 being raised by admitting fluid pressure to cylinders 90. When platform 36 moves to its upper position, link arm 96 is pivoted so that the end of the arm meshes with the teeth of rack 114 securing the platform relative to the dolly and preventing relative movement between the two while the platform is in its raised position.

The invention in its broader aspects is not limited to the specific mechanism shown and described but departures may be made therefrom, within the scope of the accompanying claims, without departing from the principles of the invention and without sacrificing its chief advantages.

What is claimed is:

1. In combination an elongated dolly, jacking mechanism forming part thereof including means vertically movable between a lower and a raised position, means for mounting said vertically movable means for vertical and longitudinal movement and means for causing vertical movement of said vertically movable means, said vertically movable means being longitudinally movable of the dolly when in the lower position and apparatus responsive to movement of the vertically movable means to its raised position throughout the range of its longitudinal movement and effective to prevent such longitudinal movement when said vertically movable means is in the raised position, said apparatus being deactivated in response to lowering of said movable means to permit such longitudinal movement.

2. The organization of claim 1 wherein said apparatus comprises a locking member attached to said vertically movable means and occupying an inactive position when said vertically movable means is in its lower position but moved to a locking position when the vertically movable means is moved to its raised position to prevent longitudinal movement of said vertically movable means relative to the dolly.

3. The organization of claim 2 wherein the locking member comprises an arm pivotally connected at one end to said vertically movable means and having its other end secured to the dolly in a manner that prevents vertical movement thereof relative to the dolly but permits pivotal and longitudinal relative movement when said vertically movable means is in its lower position but prevents such longitudinal relative movement when said vertically movable means is in its raised position.

4. In an automobile parking facility a transfer device for transferring vehicles to and from an elevator including an elongated dolly having mechanism for raising the vehicle for support from the dolly, said mechanism including means for mounting a member for movement between a lower position where it is free of the vehicle and a raised position where it is adapted to engage and lift a portion of the vehicle, said mechanism also having means for mounting said member for movement longitudinally of the dolly when in the lower position and means effective throughout the range of said longitudinal movement and in response to movement of the member to its raised position to prevent such longitudinal movement, said last named means being rendered ineffective to prevent such longitudinal movement in response to movement of the member back to its lower position.

5. The organization of claim 4 wherein the last named means comprises a link arm pivotally interconnecting said member and the dolly, the connection of the arm with one of these elements of the transfer device permitting relative movement therebetween longitudinally of the dolly when said member is in its lower position, with the arm engaging a fixed portion of this element when said member is in its raised position to prevent such movement and accordingly prevent movement of said member longitudinally of the dolly.

6. A transfer device for vehicles comprising an elongated dolly, jacking mechanism carried by the dolly for engaging and raising a vehicle for support from the dolly and including separate means generally at each end of the dolly vertically movable between an upper and a lower position, one of said means including means permitting it to be adjustable longitudinally of the dolly to accommodate vehicles of varying length and including a support, motor means operative to raise said support from a lower to an upper position, means carried by the support for engaging the vehicle when the support is moved to its raised position, this last named means being movable on said support longitudinally of the dolly when the support is in its lower position and mechanical locking mechanism operative in response to said last named means being moved to said upper position to prevent longitudinal movement thereof relative to the dolly, and being rendered ineffective to prevent such longitudinal movement in response to the said last named means being moved to its lower position.

7. The organization of claim 6 wherein the locking mechanism comprises a link arm pivotally connected generally at its opposite ends to the longitudinally movable means and the dolly, respectively, with this connection with one of these members permitting relative movement longitudinally of the dolly between the link arm and said member when the movable means is in its lower position and preventing such relative movement when the movable means is in its upper position.

8. The organization of claim 6 wherein the locking mechanism includes a link arm pivotally connected generally at its opposite ends to the longitudinally movable means and the dolly, respectively, one of these members to which the arm is connected having a portion that is movable relative to the remainder of the member in a direction restricted to the longitudinal direction of the dolly, said portion carrying the pivotal connection of the link arm, a rack fixed to said one member and disposed to be engaged by the link arm when the longitudinally movable means is in its raised position thereby preventing relative movement between the dolly and the movable means and free of said arm when said movable means is in its lower position.

References Cited in the file of this patent

UNITED STATES PATENTS

| | | |
|---|---|---|
| 2,840,346 | Du Moulin | June 24, 1958 |
| 2,846,186 | Smith | Aug. 5, 1958 |